United States Patent [19]

Kuts

[11] 3,829,950

[45] Aug. 20, 1974

[54] DEICER

[75] Inventor: Mathew Kuts, Akron, Ohio

[73] Assignee: The B.F. Goodrich Company, New York, N.Y.

[22] Filed: Apr. 4, 1973

[21] Appl. No.: 347,832

[52] U.S. Cl. .......................... 29/203 D, 29/203 MW
[51] Int. Cl. ............................................. H05k 13/06
[58] Field of Search...... 29/203 D, 203 MW, 203 R, 29/203 P, 203 DT, 203 J

[56] References Cited
UNITED STATES PATENTS 3,615,283   10/1971   Lang .............................. 29/203 R
3,736,652   6/1973   Fletcher, Jr. .................. 29/203 MW

*Primary Examiner*—Thomas H. Eager
*Attorney, Agent, or Firm*—Joseph Januszkiewicz

[57] ABSTRACT

An apparatus for the fabricating of deicers wherein a plurality of alternating slides are selectively moved by cams so that a wire extending longitudinally therethrough is wound back and forth in an alternating pattern as the slides move off the cams. Slip clutches are employed to move the respective slides in sequential order.

11 Claims, 7 Drawing Figures

DEICER

BACKGROUND OF THE INVENTION

This invention relates to the deicers and, more particularly, to an apparatus for fabricating electrically heated protective coverings known as deicer pads which are used in deicers.

A deicer pad is a thin section of flexible materials such as rubber that has wire strands wound back and forth thereacross. The strands of wire are parallel to each other. Another thin section of rubber material is then placed across the strands of wire to thereby embed the wire into the rubber material. The deicer pad is vulcanized and means are provided to connect electrical outlets thereto whereby an electrical current can be passed through the wire strands to heat up the deicer pad. Such deicer pads or electrically heated coverings are contoured to the exposed ice-forming surfaces of aircrafts such as leading edge surfaces of airfoils or wings to prevent the accumulation of ice thereon.

In the manufacture of such electrically heated protective coverings or deicer pads, it has been the practice to use a jig which has a pair of rows of pins with a plurality of pins each row. A thin section of a rubber sheet of material is placed on the jig extending between the rows of pins. The operator then winds a wire of suitable composition and thickness back and forth between the pins while progressively pushing the wire down into contact with the rubber material. One row of pins is mounted on a movable slide, which is slid away from the other row of pins to tension the wires to the proper amount. Thereafter, a second thin section of rubber material is placed onto the first section and adhered thereto. The sandwiched wound wire along with the two pads are removed as a unit for further processing, such as vulcanization.

SUMMARY OF THE INVENTION

The present invention is directed to a device that has a plurality of slides in closely adjacent relationship, with the respective one ends of the slide supporting a pin. Wire from a spool is fed across the center of the device, such that as the slides are sequentially actuated and moved; they weave the wire back and forth across the device with an even tension for locating such wound wire onto a sheet of rubber. Slip clutches are employed to move the respective slides in sequential order.

DETAILED DESCRIPTION

Figure 1:
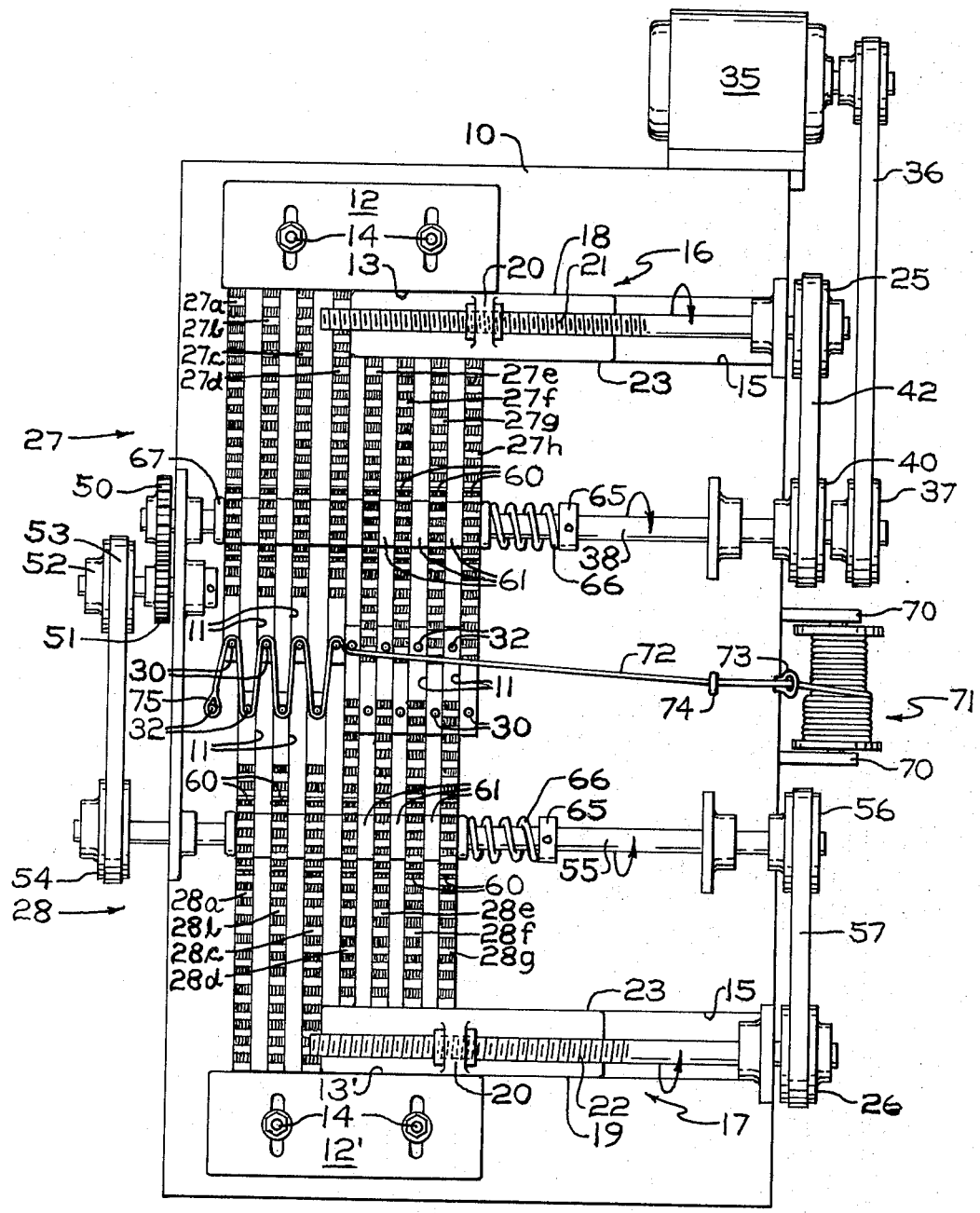
FIG. 1 is a plan view of the deicer fabricating apparatus.
Figure 2:
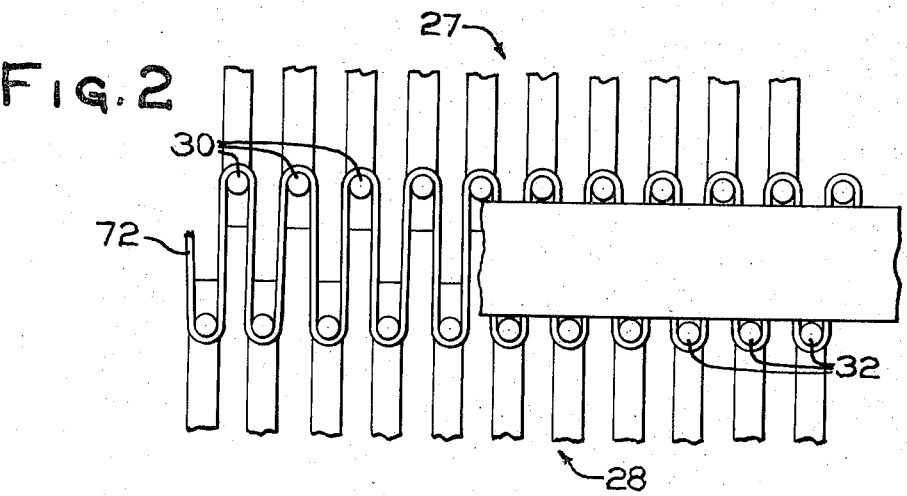
FIG. 2 is an enlarged fragmentary view of the central portion of the apparatus shown in FIG. 1 with wires in place and a portion of the thin sheet of rubber material broken away.
Figure 3:
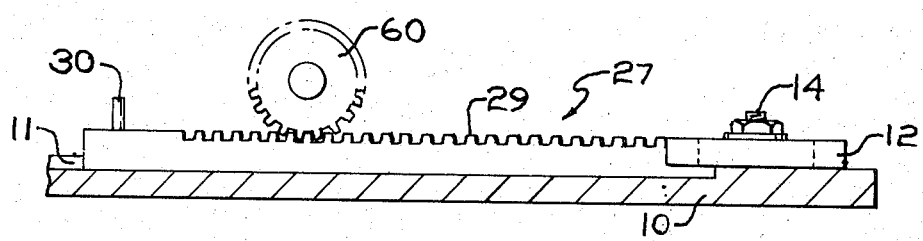
FIG. 3 is an enlarged side elevational view of a slide and a gear meshing with a rack on the upper portion of the slide.
Figure 4:
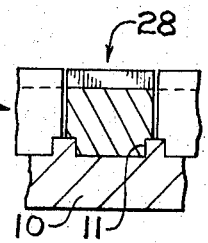
FIG. 4 is an enlarged cross-sectional view of one of the slides disposed in a guideway of the base of the deicer fabricating apparatus.
Figure 5:
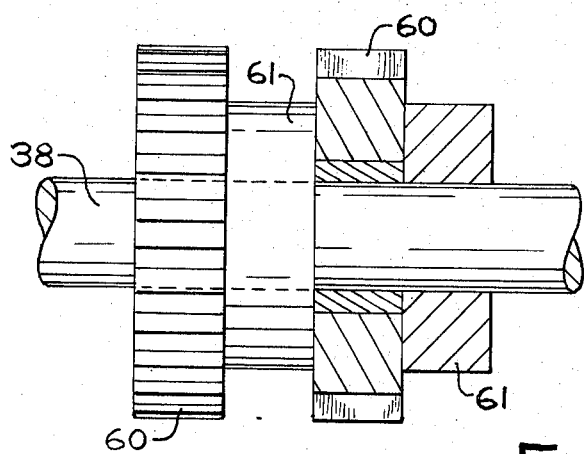
FIG. 5 is a fragmentary view of a pair of gears with one in cross section, which gears operate as slip clutches with the slides.

Referencing now to the drawings wherein like reference characters designate like or corresponding parts through the several views, there is shown in FIG. 1 a base 10 with a plurality of longitudinally extending grooves or guideways 11 extending substantially for the entire length of the base 10. Mounted at the respective end portions of the base 10 in alignment with the guideways 11 are a pair of rectangular-shaped cams 12 and 12'. The respective cams 12 and 12' have cam profiles 13 and 13' which, in the form shown in FIG. 1, is a linear edge although the configuration may assure an arcuate form or some other desired shape for a purpose to be described. The cams 12 and 12' are suitably secured to the base 10 by means of bolts 14. A pair of laterally extending guideways 15 support for movement toward and away from the cams 12 and 12', blocks or cam control blocks 16–17. The one edge 18 of the block 16 abuts the profile edge 13 of cam 12, while the edge 19 of block 17 abuts the profile edge 13' of the other cam 12'. Suitably secured to the respective intermediate portion of the respective blocks 16 and 17 are threaded nuts 20. Threadedly received by the respective nuts 20 are lead screws 21 and 22. Lead screw 21 has a pulley 25 suitably secured or keyed to one end portion thereof, which pulley 25 is journaled in suitable bearings to provide rotation to the lead screw 21. Lead screw 22 has a pulley 26 suitably secured to one end portion thereof, which pulley 26 is journaled for rotation on the base 10 (FIG. 1). A plurality of slides 27 (27a through 27h) are mounted for movement in alternate guideways 11 on the one end of the base 10 while a plurality of slides 28 (28a through 28g) are mounted in the respective remaining alternate guideways 11 on the other end portion of base 10 to provide an alternate arrangement of slides between slides 27 and 28. Slides 27 and 28 are identical in construction, however, only one slide 27 will be described. Slide 27, as depicted by FIGS. 3 and 4, is an elongated member substantially rectangular in cross section having respective lower portions recessed to facilitate the movement of the slide in the guideway 11. The upper portion of the slide has a gear rack 29 thereon for the purposes to be described. The one end of slide 27 is adapted to abuttingly engage the profile edge 13 of cam 12 or the other edge 23 of cam control block 16 depending on the location of block 16 as to be explained. The other end of the slide 27 has a vertically extending pin 30 mounted thereon. As stated, the other slide 28 is similar in construction to slide 27, however, the pin on slide 28 in FIG. 1 is designated as element 32 and the one end of slide 28 is adapted to abuttingly engage the profile edge 13' of cam 12' or the other edge 24 of cam control block 17. A motor 35 is mounted on one end of base 10 having its output shaft connected via a belt 36 to a pulley 37 that is keyed to one end of shaft 38. A pulley 40 is keyed to shaft 38 and has its output connected via a belt 42 to pulley 25 and lead screw 21. Shaft 38 has its other end keyed to a spur gear 50 which meshes with a spur gear 51 which, in turn, has its output shaft connected via a pulley 52 and belt 53 to a pulley 54 which, in turn, is keyed to shaft 55. Shaft 55 has a pulley 56 which is connected via a belt 57 to pulley 26 to drive the lead screw 22. The respective shafts 38 and 55 have a plurality of spaced spur gears 60 mounted on one end of such shaft between spacer bearings 61. The respective gears 60 mesh with the racks 29 on slides 27 and 28 as shown in FIG. 1. A collar 65 is securely mounted on the intermediate portion of the respective shafts 38 and 55. A spring 66 encompasses each shaft 38 and 55, having one end abuttingly engaging collar 65 and the other end abuttingly engaging the innermost gear 60 on shafts 38 and 55 to bias such gears leftwardly as viewed in FIG. 1 towards collars 67 mounted on the other ends of shafts 38 and 55. Such action of springs 66 provides a friction slip clutch between the respective gears 60 and the racks 29 of the respective slides 27 and 28 such that rotation is imparted to the respective gears 60, for movement of slides 27 and 28 toward cams 12 and 12' whenever cam control blocks 16 and 17 move rightwardly as viewed in FIG. 1 to permit such movement. The blocks or cam control blocks 16 and 17, together with the gears 60 and the auxiliary equipment for the operation of gears 60, operate as a slide control means for moving the slides 27 and 28 toward the cams 12 and 12' in sequential order in the manner to be described. A pair of spaced brackets 70—70 secured to one side of base 10 supports for rotation reel 71 which has a wire 72 wound thereon for passage through guides 73 and 74 for fastening to a pin 75 on the other side of base 10.

In the operation of the apparatus described assume that the respective blocks or cam control blocks 16 and 17 are at their leftward most position such that the slides 27a through 27g have their one ends in abutting contact with the one edge 23 of block 16 while the remaining slides 28a through 28g have their one end in abutting contact with the edge 24 of block 17. In this position of slides 27 and 28, the respective pins 30 and 32 are in alignment with each other as shown in a rightward portion of the respective slides in FIG. 1. It should be noted that the pins 32 as viewed in FIG. 1, will be moved downwardly as viewed in FIG. 1 while the pins 30 will be moved upwardly toward the cam 12. The wire from reel 71 is threaded through the respective guides 73 and 74 and has its end secured to pin 75 on the one side of base 10. Upon energization of motor 35, the output shaft via belt 36 and pulleys 37 and 40 and 25 will rotate lead screw 21 while simultaneously therewith shaft 38 will rotate due to the output of pulley 40 which, in turn, via support gears 50 and 51, will rotate belt 53 which imparts rotation to shaft 55 which, in turn, imparts rotation to belt 75 which rotates lead screw 22. With lead screws 21 and 22 rotating at the same relative speeds, cam control blocks 16 and 17, as viewed in FIG. 1, will be moving slowly from left to right in guideways 15 such that cam control block 27a will be the first to move off the cam control block 16 such that its one end will move into abutting engagement with the cam profile 13 during which time its pin 30 will move the wire strand in a direction toward cam 12 whereas cam control block 17 will permit slide 28a to move off its block such that its one end moves into abutting engagement with the cam profile 13'. Such action will cause pin 32 to move the wire strand downwardly toward cam 12'. Such action will continue causing cam 27b to move next into abutting contact with the cam profile 13 such that pin 30 will move the wire backward toward the cam 12 followed by weaving of the wire toward cam 12' by the movement of cam block 27b into abutting contact with the cam profile 13'. Such action will continue such that half way through the movement of the respective cam blocks 16 and 17 to the right, as viewed in FIG. 1, will reach the position shown in FIG. 1 which discloses the wire being woven back and forth under a controlled tension. Such action will continue until the respective blocks 27a through 27g and the blocks 28a through 28g all move into abutting contact with cams 12 and 12'. Suitable switching means may be provided to deactuate motor 35 and, if desired, provide a slight jog or reverse rotation to the output shaft of motor 35, which action will move the respective pins 30 away from the respective ends of the wire to permit the removal of the wound wire as a unit by the sandwiching of such wire strands between a pair of thin sheets of rubber material for further processing such as vulcanization and connection of the terminal to the wire. Such action is facilitated by the slip clutches wherein all the gears 60 which are journaled on the shafts 38 and 55 with bearing 61 similarly journaled on the shafts 38 and 55 acting as spacers and slip clutches between the respective gears as power is transmitted to the respective shafts 38 and 55, gears 60 will attempt to rotate and move their respective slides 27 or 28 through their intermeshing with the racks 29. However, if the respective end portions of such slides are in abutting engagement with the slide control block 16 or cam 12 no movement or rotation will be imparted to such clutches. However, as the slide control block 16 moves rightwardly as viewed in FIG. 1, a position will be reached wherein the next succeeding slide such as slide 27e as viewed in FIG. 1 will be free to be moved rearwardly or toward cams 12. In this condition gear 60 will rotate and move slide 27e upwardly as viewed in FIG. 1 to engage cam 12 and will thereafter slip, and the adjacent gear 60 will then be in a condition preparatory to the moving of slide 27d into engagement of cam 12 upon movement of control slide block 16 an increment to the right, as viewed in FIG. 1.

Figure 6:
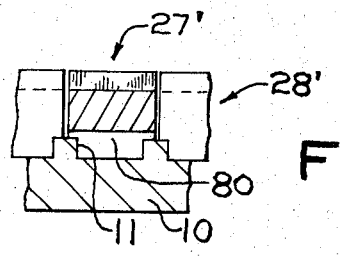
FIG. 6 is a modified form of the invention showing one of the slides in cross section.
Figure 7:
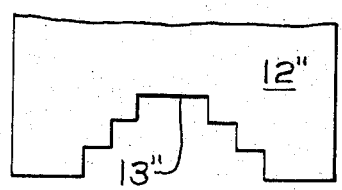
FIG. 7 is a plan view of a portion of a cam showing a nonlinear cam profile.

A modification of the deicer apparatus described above is shown in FIGS. 6 and 7 wherein the respective slide blocks 27' and 28' are recessed along the lower forward edge portion such as to facilitate the placement of a sheet of rubber material below the slide block preparatory to the weaving of the wire strand back and forth as described above. This action permits the placement of the sheet of rubber material and the subsequent weaving of the wire strands back and forth which thereby exposes the thin sheet of rubber material as the slides 27' and 28' move toward their respective cams 12 and 12' so that the thin rubber sheet can be moved upwardly along with the wires.

The cam profile 13 of cam 12 can be nonlinear such that the wires wound back and forth will extend to a specific pattern to heat or deice an area that is nonlinear in nature. By the same token, the slides 27 and 28 can vary in thickness or lateral spacing to provide for means for varying the gap between the parallel wound wires and thereby control the heating and deicing ability to the degree desired.

Various modifications are contemplated and may obviously be restored to by those skilled in the art without departing from the described invention, as hereinafter defined by the appended claims, as only preferred embodiments have been disclosed.

I claim:

1. An apparatus for the fabricating of electrically heated protective coverings comprising a base on which the thin member sheet is to be placed, said base having a plurality of guideways extending longitudinally from one end of said base to the other end; cam means mounted at each end of said base; a slide mounted in each of said guideways for movement therein; slide control means interconnecting said slides for moving alternate ones of said slides sequentially toward one end of the said base into abutting contact with one of said cam means and operative for moving the remaining ones of said slides sequentially toward the other end of said base into abutting contact with the other one of said cam means; wire supply means mounted on the intermediate portion of said base operative to dispense wire therefrom to the other side of said base; and abutment means on one end of said slide means for movement therewith facilitating the contacting and movement of wire for weaving said wire back and forth across the intermediate portion of said base as alternate ones of said slides move toward said cam means.

2. An apparatus as set forth in claim 1 wherein each of said slides have a rack integral therewith; and said slide control means includes a plurality of slip clutches operatively engaging said racks for biasing said slides toward said respective cam means.

3. An apparatus as set forth in claim 2 wherein each of said cams has a profile edge which limits the movement of said slides by said slip clutches.

4. An apparatus as set forth in claim 3 wherein said profile edge is nonlinear.

5. An apparatus as set forth in claim 2 wherein slide control means includes a pair of movable control blocks which have one edge which limit the linear movement of said slides toward said cam means, and motive drive means operatively connected to said control blocks moving said control blocks to permit the movement of said slides by said clutches into abutting contact with said cam means.

6. An apparatus as set forth in claim 2 wherein each of said slides is recessed along its lower said one end portion to provide a clearance space for the reception of a thin piece of material to facilitate the fabrication of a deicer pad.

7. A deicer apparatus comprising a base, said base having a plurality of guideways extending longitudinally from one end of said base to the other end of said base; a slide mounted in each of said guideways, cam means mounted on each end of said base; one edge of said cam means having a cam profile; alternate ones of said slides forming one set of slides and the remaining alternate ones of said slides forming another set of slides; each of said slides having one end adapted to abuttingly engage said cam profile; the other end of said slides having abutment means for engaging a wire strand extending across the intermediate portion of said base upon movement of said slide toward one or the other of said cam means; wire supply means mounted on one side of said base operative to dispense the wire strand across the intermediate portion of said base; a pin mounted on the other side of said base to which wire from said wire supply means is fastened; slide control means interconnecting said slides from moving one set of slides sequentially toward one of said cams and for moving the other set of slides sequentially toward the other of said cam means, which action weaves the wire dispensed from said wire supply means back and forth in alternating fashion.

8. A deicer apparatus as set forth in claim 7 wherein each of said slides has a rack; said slide control means includes slip clutch means operative to bias said slides toward said respective cam means.

9. A deicer fabricating apparatus as set forth in claim 7 wherein said slide control means includes a laterally extending guideway at each end of the base; a control block mounted in each of said laterally extending guideways for movement to and from a position that locates said block between said cam means and the adjacent set of said slides being operative upon actuation to permit sequential movement of said slides.

10. A deicer fabricating apparatus as set forth in claim 9 wherein each of said slides is recessed along its lower other end to provide a continuous uninterrupted clearance space between all of said slides and said intermediate portion of said base from one side of said base to the other side of base.

11. A deicer fabricating apparatus as set forth in claim 9 wherein all of said slides and their corresponding, longitudinally, extending guideways differ in width from adjacent ones of said slides to provide for a predetermined pattern of gap between adjacent parallel wires as wound on such apparatus.

* * * * *